(12) United States Patent
Rikleen et al.

(10) Patent No.: US 10,940,669 B2
(45) Date of Patent: Mar. 9, 2021

(54) INSULATING STRUCTURES

(71) Applicants: W. L. Gore & Associates, Inc., Newark, DE (US); ASPEN AEROGELS, INC., Northborough, MA (US)

(72) Inventors: Leslie Rikleen, Newark, DE (US); Michael Magyar, Elkton, MD (US); Eric O'Bryan, Greenville, DE (US); David Mihalcik, Northborough, MA (US); Owen Evans, Chelmsford, MA (US); Nicholas Zafiropoulos, Wayland, MA (US); George Gould, Mendon, MA (US)

(73) Assignees: W. L. Gore & Associates, Inc., Newark, DE (US); Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 16/711,070

(22) Filed: Dec. 11, 2019

(65) Prior Publication Data

US 2020/0114619 A1 Apr. 16, 2020

Related U.S. Application Data

(63) Continuation of application No. 15/417,062, filed on Jan. 26, 2017, now abandoned.

(Continued)

(51) Int. Cl.
*B32B 5/18* (2006.01)
*B32B 5/02* (2006.01)

(Continued)

(52) U.S. Cl.
CPC .............. *B32B 5/18* (2013.01); *B32B 3/06* (2013.01); *B32B 5/02* (2013.01); *B32B 5/022* (2013.01); *B32B 5/024* (2013.01); *B32B 5/026* (2013.01); *B32B 5/06* (2013.01); *B32B 5/145* (2013.01); *B32B 5/16* (2013.01); *B32B 5/22* (2013.01); *B32B 5/245* (2013.01); *B32B 5/32* (2013.01); *B32B 7/02* (2013.01); *B32B 7/08* (2013.01); *B32B 7/10* (2013.01); *B32B 7/12* (2013.01); *B32B 27/08* (2013.01); *B32B 27/304* (2013.01); *B32B 27/32* (2013.01); *B32B 27/322* (2013.01); *B32B 27/40* (2013.01); *B32B 37/12* (2013.01); *B32B 37/14* (2013.01); *B32B 2250/03* (2013.01); *B32B 2250/40* (2013.01); *B32B 2260/02* (2013.01); *B32B 2260/04* (2013.01);

(Continued)

(58) Field of Classification Search
CPC ......... B32B 5/18; B32B 5/022; B32B 27/322; B32B 5/32; B32B 2266/126
See application file for complete search history.

(56) References Cited

U.S. PATENT DOCUMENTS

2006/0264132 A1* 11/2006 Leeser ................. D04H 1/4382 442/77
2009/0029147 A1* 1/2009 Tang ..................... B32B 27/40 428/319.1

\* cited by examiner

*Primary Examiner* — Hai Vo
(74) *Attorney, Agent, or Firm* — Greenberg Traurig, LLP

(57) ABSTRACT

Described herein are insulating structures that include at least one microporous layer including a plurality of pores, a porous layer adjacent to the microporous layer, and a monolithic aerogel structure extending through the plurality of pores of the microporous layer and through at least part of the porous layer. The microporous layer filters aerogel dust from cracked or damaged aerogel within the scaffold, slowing or preventing loss of dust from the insulating structures.

5 Claims, 5 Drawing Sheets

Related U.S. Application Data

(60) Provisional application No. 62/287,762, filed on Jan. 27, 2016.

(51) Int. Cl.
| | | |
|---|---|---|
| *B32B 27/32* | (2006.01) |
| *B32B 3/06* | (2006.01) |
| *B32B 5/14* | (2006.01) |
| *B32B 5/16* | (2006.01) |
| *B32B 7/08* | (2019.01) |
| *B32B 5/32* | (2006.01) |
| *B32B 5/06* | (2006.01) |
| *B32B 7/02* | (2019.01) |
| *B32B 7/10* | (2006.01) |
| *B32B 5/22* | (2006.01) |
| *B32B 27/08* | (2006.01) |
| *B32B 27/30* | (2006.01) |
| *B32B 27/40* | (2006.01) |
| *B32B 5/24* | (2006.01) |
| *B32B 7/12* | (2006.01) |
| *B32B 37/12* | (2006.01) |
| *B32B 37/14* | (2006.01) |

(52) U.S. Cl.
CPC ... *B32B 2262/02* (2013.01); *B32B 2262/0207* (2013.01); *B32B 2262/0238* (2013.01); *B32B 2262/0261* (2013.01); *B32B 2262/0276* (2013.01); *B32B 2262/0292* (2013.01); *B32B 2264/0257* (2013.01); *B32B 2264/101* (2013.01); *B32B 2264/107* (2013.01); *B32B 2266/025* (2013.01); *B32B 2266/0257* (2013.01); *B32B 2266/0278* (2013.01); *B32B 2266/0285* (2013.01); *B32B 2266/04* (2013.01); *B32B 2266/045* (2013.01); *B32B 2266/06* (2013.01); *B32B 2266/126* (2016.11); *B32B 2305/022* (2013.01); *B32B 2305/08* (2013.01); *B32B 2307/302* (2013.01); *B32B 2307/304* (2013.01); *B32B 2307/51* (2013.01); *B32B 2307/726* (2013.01); *B32B 2307/732* (2013.01); *B32B 2437/00* (2013.01)

INSULATING STRUCTURES

CROSS REFERENCE TO RELATED APPLICATIONS

This application is a continuation of U.S. patent application Ser. No. 15/417,062, filed Jan. 26, 2017, which claims priority to U.S. Provisional Application No. 62/287,762 filed on Jan. 27, 2016, which is incorporated herein by reference in its entirety.

FIELD

The present disclosure relates generally to the field of aerogel insulating materials, and in particular to insulating materials including aerogel materials contained within scaffolds, related composite structures, and methods of making.

BACKGROUND

Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties.

Aerogel materials are excellent insulators due primarily to their low density and highly porous structure. Aerogel materials typically include very small pores on a scale of less than about 100 nm. Aerogel structures are typically fragile but may be reinforced to achieve improved mechanical performance while maintaining beneficial thermal insulating properties. Aerogel materials may also be incorporated into multilayered structures; however, aerogel materials can be brittle and difficult to handle. The brittleness of low density aerogels can present significant complications during production and processing, which can significantly limit large scale manufacturing of these materials. The brittleness of aerogels can also make the installation and application of aerogels and aerogel-containing materials difficult, due to dusting, cracking or structural degradation concerns.

U.S. Pat. No. 6,544,618 describes an insulating composite having (a) a first thermally reflective layer having a reflective surface and an opposite surface, (b) a second thermally reflective layer having a reflective surface and an opposite surface, and (c) a porous metal oxide film having a thickness of 20 µm or less that is positioned between the first and second thermally reflective layers such that there is substantially no direct physical contact (thermal bridging) between the first and second thermally reflective layers. Similarly, U.S. Pub. No. 2003/0003284 describes a multilayer composite with at least one aerogel-containing layer and at least one layer containing polyethylene terephthalate fibers. U.S. Pat. No. 6,316,092 teaches an aerogel coating applied to a film.

U.S. Pub. No. 2009/0029147 provides reinforced aerogel monoliths as well as reinforced composites thereof for a variety of uses. There is provided a flexible aerogel-open cell foam composite, comprising at least one open cell foam component and at least one aerogel matrix. The open cell foam component of said flexible aerogel-open cell foam composite has a pore size greater than 50 microns or wherein the open cell foam is a coarse cell foam.

U.S. Pub. No. 2007/0173157 is directed to an insulating structure comprising at least one fibrous layer comprising a continuous matrix of an aerogel material infused therein that is secured with an adhesive to a polymeric sheet. The aerogel is incorporated into a fibrous layer to which polymeric sheets are affixed. The fibrous layer additionally is coated with a material such as silicone, polyurethane, or acrylic to reduce dust from escaping the insulating structure.

U.S. Pat. No. 7,118,801 is directed to material comprising aerogel particles and a polytetrafluoroethylene binder having a thermal conductivity of less than or equal to 25 mW/m K at atmospheric conditions. The material is moldable or formable, having little or no shedding of filler particles, and may be formed into structures such as tapes or composites, for example, by bonding the material between two outer layers. These composites may be flexed, stretched, or bent without significant dusting or loss of insulating properties.

Despite the teaching of the prior art, there remains a need for aerogel insulating structures that provide good insulating properties without allowing excessive aerogel dust to escape the insulating structure.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Disclosed herein are insulating structures including a scaffold and a monolithic aerogel structure within the scaffold. In some embodiments, the insulating structure includes a multilayer scaffold with a monolithic aerogel structure present within the multilayer scaffold. In some embodiments, at least one of the layers of the scaffold is microporous.

Provided herein are insulating structures including a scaffold having at least one microporous layer with a first plurality of pores, and a monolithic aerogel structure extending through the plurality of pores of the microporous layer.

In one embodiment there is provided an insulating structure comprising a scaffold comprising at least one microporous layer, and at least one monolithic aerogel structure extending through a plurality of pores of the microporous layer. The microporous layer is a microporous film, such as an expanded fluoropolymer film, expanded polytetrafluoroethylene (ePTFE) film, expanded polyethylene (ePE) film, or expanded polypropylene (ePP) film. In one embodiment, the microporous layer comprises a pore size from 0.03 µm to 210 µm, e.g., 0.03 µm to 15 µm.

In further embodiments, the scaffold may also comprises a porous layer and the monolithic aerogel structure extends through a plurality of pores of the porous layer. The at least one microporous film has a smaller pore size than the porous layer. In one embodiment, the porous layer has a Gurley number of 300 sec. or less, e.g., 50 sec. or less. The porous layer may be an open cell foam, such as a reticulated foam. Suitable open cell foams include a reticulated vitreous carbon foam, a polyurethane foam, a melamine foam, a polyimide foam, a ceramic foam, or a metal foam. In other embodiments, the porous layer may be a textile layer, such as a woven, nonwoven or knitted textile.

In one embodiment, the monolithic aerogel structure comprises an organic, inorganic or hybrid organic-inorganic material. The monolithic aerogel structure may comprise silica, titania, zirconia, alumina, hafnia, yttria, ceria, carbides, nitrides, variants of the foregoing or a combination thereof. In one embodiment, the monolithic aerogel structure extends across the interfaces between adjacent microporous and porous layers.

In another embodiment there is provided an insulating structure comprising a scaffold comprising at least one microporous layer, such as an expanded fluoropolymer film, an expanded polytetrafluoroethylene (ePTFE) film, an expanded polyethylene (ePE) film, or an expanded polypropylene (ePP) film, and at least one porous layer, such as a foam layer or a textile layer, adjacent to the microporous layer, and an aerogel structure, wherein a portion of the aerogel structure extends through at least a portion of the microporous layer and also extends through at least a portion of the adjacent porous layer.

In one embodiment there is provided an insulating structure comprising a scaffold comprising at least one microporous layer and at least one porous layer, wherein the at least one microporous layer is adjacent to the porous layer on at least one side of the porous layer; and an aerogel structure, wherein a portion of the aerogel structure extends through at least a portion of the microporous layer and also extends through at least a portion of the porous layer, wherein the at least one microporous layer comprises expanded polyethylene (ePE) film. In one embodiment, the ePE film comprises a pore size from 0.03 μm to 210 μm, e.g., from 0.03 μm to 15 μm.

In a further embodiment there is provided an insulating structure comprising a scaffold comprising at least two microporous layers and at least one porous layer, wherein the two microporous layers are adjacent to the porous layer on opposite sides of the porous layer; and an aerogel structure, wherein a portion of the aerogel structure extends through at least a portion of the microporous layers and also extends through at least a portion of the porous layer, wherein the at least two microporous layers comprises expanded polytetrafluoroethylene (ePTFE) film. In one embodiment, the ePTFE film comprises a pore size from 0.03 μm to 210 μm, e.g., from 0.03 μm to 15 μm.

BRIEF DESCRIPTION OF THE DRAWINGS

The accompanying drawings are included to provide a further understanding of the disclosure and are incorporated in and constitute a part of this specification to illustrate embodiments. Together with the description the drawings serve to explain the principles of the disclosure. The accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Figure 1:
FIG. 1 is a cross-section view of a scaffold of a microporous layer including a monolithic aerogel structure disposed therein in accordance with embodiments disclosed herein.

Persons skilled in the art will readily appreciate that various aspects of the disclosure can be realized by any number of methods and apparatus configured to perform the intended functions.

Definitions

For purposes of this disclosure "porous" or "porous material" or "porous layer" refer to a reinforcing material for an aerogel with the ability to transmit fluids (liquid or gas) through the layer when the material is subjected to a differential pressure or concentration across it (e.g. during the process of introducing the gel precursor solution) and characterized by a Gurley number of 300 sec or less. In some embodiments, a porous material described herein is characterized by a Gurley number of 50 sec or less, 10 sec or less, or 1 sec or less. Porous materials can be characterized by a pore size equal to or greater than 0.03 μm. The term porous indicates presence of voids, but not a specific size of voids within a material. For example, porous includes both microporous polymeric materials and open-cell foam materials, and the open cell foam materials described herein generally include pores larger, and in some cases substantially larger, than the pores of a microporous material. The porous materials described herein are reinforcement materials for aerogels and thus "porous" and "porous materials" as used herein do not include aerogels. There are many techniques by which to measure pore size, including but not limited to bubble point, mean flow pore size, liquid entry pressure, porosimetry, and image analysis with SEM, MicroCT, or other imaging tools. The presence of pores can be determined with or without the use of magnification, as appropriate, and may optionally be determined by the removal of materials that fill the pores.

For purposes of this disclosure "microporous" refers to a porous material characterized by a pore size ranging from 0.03 μm to 210 μm as indicated by bubble point and a Gurley number of 300 seconds or less. In some embodiments, a microporous material as described herein may have a pore size of 0.03 to 115 µm, e.g., 0.03 to 15 µm or 0.03 to 0.6 µm. In some embodiments, a microporous material as described herein may have a Gurley number of 50 seconds or less, e.g., 10 seconds or less, or 1 second or less.

For purposes of this disclosure "aerogel" or "aerogel material" refer to a dry, solid material formed from a gel and comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore size ranging from about 2 nm to about 100 nm, (b) a porosity of at least 80% or more, and (c) a surface area of about 20 m$^2$/g or more. Aerogel materials of the present disclosure thus include any aerogels or other open-celled compounds which satisfy the forgoing defining elements; including compounds which can be otherwise categorized as xerogels, cryogels, ambigels, microporous materials, and the like.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore size of between 2 and 50 nm; though satisfaction of these additional properties is not required for the characterization of a compound as an aerogel material.

For purposes of this disclosure, "monolithic aerogel structure" refers to aerogel material in which a majority (by weight) of the aerogel included in the aerogel material or composition is in the form of a unitary interconnected aerogel nanostructure. Monolithic aerogel structures include aerogel materials which are initially formed to have a unitary interconnected gel or aerogel nanostructure, but which are subsequently cracked, fractured or segmented into nonunitary aerogel nanostructures. Monolithic aerogel structures are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

For purposes of this disclosure "scaffold" refers to a supporting structure, including any solid material having voids that can house another material. The scaffolds described herein function as reinforcing materials, or reinforcing phases, for the aerogel materials. Exemplary scaffold structures include, but are not limited to, foams, fibers, corrugations, honeycombs, networks of nodes and/or fibrils, and reinforced scaffolding structures. The scaffolds described herein may comprise foams and non-woven textiles. The scaffolds described herein may also comprise microporous materials, such as polymeric films. The scaffolds described herein house aerogels and optionally other materials within void spaces in the scaffold, and may thereby include or comprise those aerogels or other materials, but the aerogel or other materials housed within the scaffold are not part of the scaffold itself. A scaffold as described herein may include a single reinforcing material, or may include two or more different reinforcing materials, such as in a layered configuration. As one non-limiting example, a scaffold as described herein may include a base layer (such as porous layer made from a foam or textile) and one or more facing layers (such as a microporous polymeric film). When a scaffold includes multiple layers, the adjacent layers may define interfaces there between.

Within the context of the present disclosure, the term "facing layer" refers to a microporous layer of a scaffold. In some embodiments, the facing layer is a film. The facing layer is adjacent to a porous layer or base layer. In some embodiments, the facing layer is thinner than the adjacent porous layer. As described herein, the facing layer reduces dusting of the aerogel contained within the scaffold. In some embodiments, a facing layer is an outermost layer and may have one surface that is exposed to the environment. In other embodiments, there may be a further layer on a surface of the facing layer opposite of the base layer and the facing layer is understood to be an inner layer.

Within the context of the present disclosure, the term "foam" refers to a material comprising interconnected structures, with a corresponding network of interconnected pores or collection of independent pores integrated within the material, and containing gases such as air as a dispersed medium within the pores of the material. In some embodiments, a foam described herein has an average pore diameter above 300 µm. In some embodiments, a foam described herein is a polymeric foam, a ceramic foam, or a metal foam. Alternatively, the term "foam" can refer to a material comprising a porous solid formed by a dispersion in which a large proportion of gas by volume is dispersed in the form of gas bubbles into a liquid, solid or gel, wherein the gas bubbles are often stabilized by solid particles or by soluble substances. In general, foams can be made using a wide variety of processes—see, for example, U.S. Pat. Nos. 6,147,134; 5,889,071; 6,187,831; and 5,229,429.

The pores within the foam framework can also be referred to as "cells". Cells can be divided by cell walls or membranes, creating a collection of independent closed pores within the foam. The term "closed cell foam" refers to foam materials in which at least 50% of the pore volume is confined cells enclosed by membranes or walls. Cells in the foam can also be interconnected through cell openings, creating a network of interconnected open pores within the foam. The term "open cell foam" refers to foam materials in which at least 50% of the pore volume is open cells. The open-cell foam can comprise a reticulated open-cell foam, a non-reticulated open-cell foam, or a combination thereof. Reticulated foams are open cell foams which are produced through a reticulation process which eliminates or punctures cell membranes within the foam material. Reticulated foams typically have a higher concentration of open cells than nonreticulated foams. Generally, no foam material has entirely one type of cell structure (open cell or close cell). Foams can be made using a wide variety of processes, including foam production processes presented in U.S. Pat. Nos. 6,147,134, 5,889,071, 6,187,831, 5,229,429, 4,454, 248, and US Patent Application No 20070213417.

Within the context of the present disclosure, the term "rebonded foam" refers to a foam that results from a process of adhering together a collection of particles or pieces of foam material (often manufacturing scrap). Various adhesives and bonding processes may be used, and the foam used may be ground or shredded prior to rebonding. Foam may be rebonded as a way to lower cost through the use of foam that would otherwise be waste. A typical application for rebonded foam is as carpet underlay.

For purposes of this disclosure, "film" refers to a substantially continuous, interconnected sheet-like structure made of a polymer or co-polymer. Films as used herein may include membranes. Films as used herein may include multiple layers.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

Within the context of the present disclosure, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present disclosure can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present invention, the term "wet gel" refers to a gel in which the mobile interstitial phase within the network of interconnected pores is primarily comprised of a liquid phase such as a conventional solvent, a liquefied gas such as liquid carbon dioxide, or a combination thereof. Aerogels typically require the initial production of a wet gel, followed by innovative processing and extraction to replace the mobile interstitial liquid phase in the wet gel with air to form a dry gel. Examples of wet gels include, but are not limited to: alcogels, hydrogels, ketogels, carbonogels, and any other wet gels known to those in the art.

Within the context of the present invention, the terms "additive" or "additive element" refer to materials which can be added to an aerogel before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published US Pat. App. 20070272902 A1 (Paragraphs [0008] and [0010]-[0039]) includes teachings of smoke suppressants and fire suppressants, and is hereby incorporated by reference according to the individually cited paragraphs.

Within the context of the present disclosure, the terms "flexible" and "flexibility" refer to the ability of an aerogel material or composition to be bent or flexed without macrostructural failure. Preferably, insulating structures of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, Pa.).

Aerogel materials or compositions of the present invention can be flexible, highly flexible, and/or classified flexible. Aerogel materials or compositions of the present invention can also be drapable. Within the context of the present invention, the terms "drapable" and "drapability" refer to the ability of an aerogel material or composition to be bent or flexed to 90° or more with a radius of curvature of about 4 inches or less, without macroscopic failure. An aerogel material or composition of the present invention is preferably flexible such that the composition is non-rigid and may be applied and conformed to three-dimensional surfaces or objects, or pre-formed into a variety of shapes and configurations to simplify installation or application.

Within the context of the present disclosure, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present disclosure preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions of the present disclosure which can be classified as resilient flexible according to ASTM classification standard C1101 (ASTM International, West Conshohocken, Pa.).

Within the context of the present disclosure, the term "self-supporting" refers to the ability of an aerogel material or composition to be flexible and/or resilient based primarily on the physical properties of the aerogel and any reinforcing phase in the insulating structure. Self-supporting aerogel materials or compositions of the present disclosure can be differentiated from other aerogel materials, such as coatings, which rely on an underlying substrate to provide flexibility and/or resilience to the material.

Within the context of the present disclosure, the term "shrinkage" refers to the ratio of: 1) the difference between the measured final density of the dried aerogel material or composition and the target density calculated from solid content in the sol-gel precursor solution, relative to 2) the target density calculated from solid content in the sol-gel precursor solution. Shrinkage can be calculated by the following equation: Shrinkage=[Final Density $(g/cm^3)$–Target Density $(g/cm^3)$]/[Target Density $(g/cm^3)$]. Preferably, shrinkage of an aerogel material of the present disclosure is preferably 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. Thermal conductivity may be recorded in SI units as mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present disclosure, thermal conductivity measurements are acquired according to ASTM C177 or C518 standards, at a temperature of about 37.5° C. at atmospheric pressure, and a compression of about 2 psi, unless otherwise stated. Preferably, aerogel materials or compositions of the present disclosure have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the true density of an aerogel material, as well as the bulk density of an insulating structure. Density is typically recorded as $kg/m^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 or C303 standards, unless otherwise stated. Preferably, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water. Hydrophobicity of an aerogel material or composition can be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water which is absorbed or otherwise retained by an aerogel material or composition when exposed to liquid water under certain measurement conditions. The liquid water uptake of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, Pa.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom).

Within the context of the present disclosure, measurements of liquid water uptake are acquired according to ASTM C1511 standards, under ambient pressure and temperature, unless otherwise stated. In some embodiments, aerogel materials or compositions of the present disclosure can have a liquid water uptake of according to ASTM C1511 of about 100 wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. In some embodiments, aerogel materials or compositions of the present disclosure can have a liquid water uptake of according to ASTM C1763 of about 100 vol wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved liquid water uptake relative to another aerogel material or composition will have a lower percentage of liquid water uptake/retention relative to the reference aerogel materials or compositions.

Hydrophobicity of an aerogel material or composition can be expressed by measuring the equilibrium contact angle of a water droplet at the interface with the surface of the material. In some embodiments, aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present invention, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethylsilicates, partially hydrolyzed polyethysilicates, monomeric alkylalkoxy silanes, bis-trialkoxy alkyl or aryl silanes, polyhedral silsesquioxanes, or combinations thereof.

In one embodiment of the present invention, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl triethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present invention to any specific type of hydrophobic treatment procedure or aerogel substrate. The present invention can include any gel or aerogel known to those in the art, as well as associated methods of hydrophobic treatment of the aerogels, in either wet-gel form or dried aerogel form.

Hydrophobic treatment may be carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_NMX_{4-N}$ (hydrophobizing agent)+MOH (silanol) →$MOMR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieites. Specific examples of such hydrophobizing agents include, but are not limited to: hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to: vinyltriethoxysilane and vinyltrimethoxysilane.

Organic aerogels are generally formed from carbon-based polymeric precursors. Such polymeric materials include, but are not limited to: resorcinol formaldehydes (RF), polyimide, polyacrylate, polymethyl methacrylate, acrylate oligomers, polyoxyalkylene, polyurethane, polyphenol, polybutadiene, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylam ides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, R—Si(OX)$_3$, with traditional alkoxide precursors, Y(OX)$_4$. In these formulas: X may represent, for example, CH$_3$, C$_2$H$_5$, C$_3$H$_7$, C$_4$H$_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present invention, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the invention include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present invention may include inorganic silica aerogels formed primarily from alcohol solutions of hydrolyzed silicate esters formed from silicon alkoxides. However, the invention as a whole may be practiced with any other aerogel compositions known to those in the art, and is not limited to any one precursor material or amalgam mixture of precursor materials.

Devices and Methods

Disclosed herein are insulating materials including scaffolds having monolithic aerogel structures disposed therein. The scaffolds are porous enough for an aerogel precursor to infiltrate the scaffold. Once the aerogel precursor cures, however, the scaffolds exhibit high aerogel dust retention. By contrast, a non-porous structure could retain aerogel dust, but could not allow infiltration.

The insulating structures described herein are useful in garments, shoes, textiles, and other applications. In some embodiments, an insulating structure as described herein includes a scaffold comprising at least one microporous layer including a first plurality of pores, and a monolithic aerogel structure extending through the plurality of pores of the microporous layer. The microporous layer is a scaffold that houses the monolithic aerogel structure. In some embodiments, the microporous layer is a microporous film. In some embodiments, the microporous layer or film includes pores having a pore size of less than 210 μm. The monolithic aerogel structure extends through a plurality of those pores, which plurality may be a subset of all of the pores in the microporous layer or film. In some embodiments, a monolithic aerogel structure extends through a majority of the pores, or more than 50% of the pores, of a microporous layer or film. That is, the monolithic aerogel structure extends through multiple pores, but not necessarily through the entirety of the microporous layer. For example, in some embodiments, the entirety of the microporous layer may include two or more monolithic aerogel structures each extending through a plurality of pores in the microporous layer. Alternatively, in some embodiments, a single monolithic aerogel structure extends through the entirety of the microporous layer. In some embodiments, a single monolithic aerogel structure initially extends through the entirety of the microporous layer, but over time may crack or break into multiple monolithic aerogel structures, each of which extend through a plurality of pores of the microporous layer. In each of these embodiments, the microporous layer includes a plurality of pores and a monolithic aerogel structure extending through the plurality of pores.

A monolithic aerogel structure as described herein is a unitary interconnected aerogel nanostructure. As one non-limiting example, a monolithic aerogel structure could be made by preparing a solution comprising a gel precursor material, introducing that solution into a microporous layer, and then gelling, aging, and/or drying the solution. This is one process that can produce a unitary interconnected structure. As defined above, "monolithic aerogel structure" as used herein does not include agglomeration of individual aerogel particles.

Materials useful as a microporous layer, or microporous film, as described here include but are not limited to expanded fluoropolymers, expanded PTFE (ePTFE), modified PTFE polymers, TFE copolymers, expanded polypropylene (ePP), expanded polyethylene (ePE), and porous polyvinylidene fluoride. Useful ePTFE materials may have a microstructure comprising nodes, fibrils, and voids between the nodes and fibrils. In such a structure, the voids may be at least partially filled by the monolithic aerogel structure. For purposes of this disclosure, materials useful for the microporous layer do not include textiles or fibrous layer created from microporous fibers.

In one embodiment, the microporous layer comprises a fluoropolymeric material, such as polytetrafluoroethylene (PTFE); polyvinylfluoride (PVF); polyvinylidene fluoride (PVDF); perfluoroalkoxy (PFA); fluorinated ethylene-propylene (FEP); Polychlorotrifluoroethylene (PCTFE); ethylene tetrafluoroethylene (ETFE); polyvinylidene fluoride (PVDF); ethylene chlorotrifluoroethylene (ECTFE); or copolymer or mixtures thereof.

In some embodiments, an insulating structure described herein includes a scaffold including at least one microporous film and at least one porous layer. The porous layer typically is thicker than the microporous film, and may be substantially thicker. Thus, the microporous film may function as a facing layer for the porous layer, which may also be called a base layer. In some embodiments, a facing layer is not necessarily an outermost layer.

The microporous film facing layer and the porous base layer need not have different porosities; however, in some embodiments, the porous layer includes pores having a larger size than the microporous film as indicated by bubble point. In some embodiments the porous layer has a Gurley number of 1 sec or less. In some embodiments, the microporous film has a Gurley number of 300 sec or less. In some embodiments, some of the pores of the microporous and porous materials may overlap in size. The porous layer may include pores having an average pore size greater than the average pore size of the microporous film.

The scaffold materials of the microporous film and the at least one porous layer may be the same or different materials. For example, the scaffold may include a microporous film that is a polymeric material (such as ePTFE, ePP, ePE, or any other suitable microporous material) and a porous layer that is a foam or textile. In one embodiment, the scaffold may comprise a porous foam layer having microporous films comprising ePTFE on opposite surfaces of the porous layer and the aerogel extends through the interface between the foam layer and ePTFE films to form a monolithic aerogel structure. In one embodiment, the scaffold may comprise a porous nonwoven textile layer having microporous films comprising ePTFE on opposite surfaces of the porous foam and the aerogel extends through the interface between the nonwoven textile and ePTFE films to form a monolithic aerogel structure. In another embodiment, the scaffold may comprise a porous foam layer having microporous films comprising ePE on opposite surfaces of the porous layer and the aerogel extends through the interface between the foam layer and ePE films to form a monolithic aerogel structure. In another embodiment, the scaffold may comprise a porous nonwoven textile layer having microporous films comprising ePE on opposite surfaces of the porous layer and the aerogel extends through the interface between the nonwoven textile layer and ePE films to form a monolithic aerogel structure. It should be understood that combinations of the polymeric materials may be used.

When the scaffold includes both a microporous film and a porous layer, the microporous film can be called a facing layer and the porous layer may be called a base layer. The porous base layer may have an upper surface and an opposing lower surface, wherein at least one of the upper and lower surfaces is adjacent to a surface of the microporous film facing layer. In some embodiments, the facing layer is attached to the base layer, for example, by using an adhesive. Examples of adhesives which can be used in embodiments disclosed herein include, but are not limited to: cement based adhesives, sodium silicates, latexes, pressure sensitive adhesives, silicone, polystyrene, aerosol adhesives, urethanes, acrylate adhesives, hot melt boding systems, boding systems commercially available from 3M, epoxy, rubber resin adhesives, polyurethane adhesive mixtures such as those described in U.S. Pat. No. 4,532,316.

The facing layer can also be attached to the base layer by using non-adhesive materials or techniques which are suitable for securing inorganic or organic facing materials to the reinforcing material of the base layer. Examples of non-adhesive materials or techniques which can be used in the present invention include, but are not limited to: heat sealing, ultrasonic stitching, RF sealing, stitches or threading, sealing bags, rivets or buttons, clamps, wraps, or other non-adhesive lamination materials. In a preferred embodiment, the facing layer is attached to the base layer by stitching or riveting. In another preferred embodiment, the facing layer is attached to the base layer by ultrasonic sewing or bonding.

The facing layer material (i.e., the microporous layer or film) and the base layer material (i.e., the porous layer) both have sufficient porosity for an aerogel precursor fluid to infiltrate the pores of the reinforcement material. Thus, the microporous film facing layer can be attached to the porous base layer prior to infusion of an aerogel precursor solution, e.g., a sol gel solution, into the facing and base materials. Due to the porosity of the materials, aerogel precursor can be infused directly into the base layer or into and through the facing layer into the base layer. The aerogel precursor can partially or entirely fill the pores of the microporous facing layer and porous base layer such that the resulting dry aerogel material exists as a monolithic aerogel structure partially or entirely throughout both the microporous facing layer and porous base layer. In some embodiments, at least the facing layer material has a porosity small enough to retain aerogel dust that can form during use of the finished insulating structure.

In certain embodiments the porous base layer may be an open-cell foam. As non-limiting examples, the open-cell foam may be a reticulated vitreous carbon, a polyurethane foam, a melamine foam, a ceramic foam, a metal foam, a polyimide foam, or another polymeric foam. Other examples of useful foams include, but are not limited to, foams made from polyolefins, phenolics, cellulose acetate, and polystyrene. In some embodiments, the foams are polyether polyurethane foams. In some embodiments, the foam may be a reticulate form. Examples of useful reticulated foams include, but are not limited to, polyester polyurethane. Examples of polyurethane and polyepoxide foams useful in the present invention are presented in U.S. Pat. Nos. 2,117,605, 3,094,433, 2,739,134, 3,112,524, 2,789,095, 3,129,191, 2,811,499, 3,171,820, 2,831,820, 2,920,983, 3,342,922, 2,926,390, 3,386,877, 2,936,294, 3,459,274, 2,993,869, 3,504,064, 3,025,200, 3,506,600, 3,055,360, 3,650,993, 3,057,750, 3,860,537, 3,060,137, 4,252,517, 3,075,926, 3,082,611 and 3,090,094. Examples of melamine foams for use in the present invention are presented in U.S. Pat. Nos. 8,546,457, 4,666,948, and WO 2001/094436. The foam reinforcement material can be a rebonded foam.

In other embodiments, the porous layer may be a fibrous layer, for example, a textile. As non-limiting examples, the porous layer may comprises textile that is a woven material, a knitted material, or a non-woven material. It is recognized in the art that textiles are porous. Examples of materials for a fibrous layer include, but are not limited to, discrete fibers, battings, webs, mats, felts, or combinations thereof. Fiber reinforcement materials can comprise a range of materials, including, but not limited to: Polyesters, polyolefin terephthalates, poly(ethylene) naphthalate, polycarbonates (examples Rayon, Nylon), cotton (e.g. Lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

In one embodiment a monolithic aerogel structure extends through a plurality of pores of the microporous film and also through at least a portion of the porous base layer. The microporous film and the porous base layer may contact each other at an interface, such that they form a multi-layer scaffold. In some embodiments, the monolithic aerogel structure extends across the interface.

An insulating structure described herein includes a scaffold including at least one porous layer and two microporous films, one on either side of the porous layer. In some embodiments, the porous layer has an upper surface and an opposing lower surface. The upper surface may be adjacent to a surface of a first microporous film and the lower surface may be adjacent to a surface of a second microporous film. In some embodiments, a monolithic aerogel structure extends through a plurality of pores of each of the first and second microporous films and also through at least a portion of the porous layer. The first microporous film and the porous layer may contact each other at first interface, while the second microporous film and the porous layer may contact each other at a second interface, such that the two microporous films and the porous layer form a multi-layer scaffold. In some embodiments, the monolithic aerogel structure extends across the first and second interfaces.

The number of microporous and porous layers in an insulating structure as described herein is not limited, and a desired number and order of layers could be determined by a person skilled in the art based on the intended application for the insulating structure.

Turning now to FIG. 1, the insulating structure 100 has a microporous film 102 that acts as a scaffolding for a monolithic aerogel structure 104. Microporous film 102 comprises a plurality of pores and the monolithic aerogel structure 104 extends through those pores. In one embodiment, the monolithic aerogel structure 104 is continuous and is connected within the pores. This allows the monolithic aerogel structure 104 to extend from opposing surfaces of the microporous film 102 and throughout the length and width of the microporous film 102. The aerogel material at least partially, or in some embodiments completely, fills the pores of the microporous film 102.

The microporous film 102 may prevent aerogel dust from being freed therefrom. Freed dust degrades thermal properties and causes manufacturing problems. In some embodiments, microporous film 102 may be adhered or laminated to a structural layer (not shown) such as a textile layer. The textile layer may be a woven, knitted or non-woven material.

Figure 2:
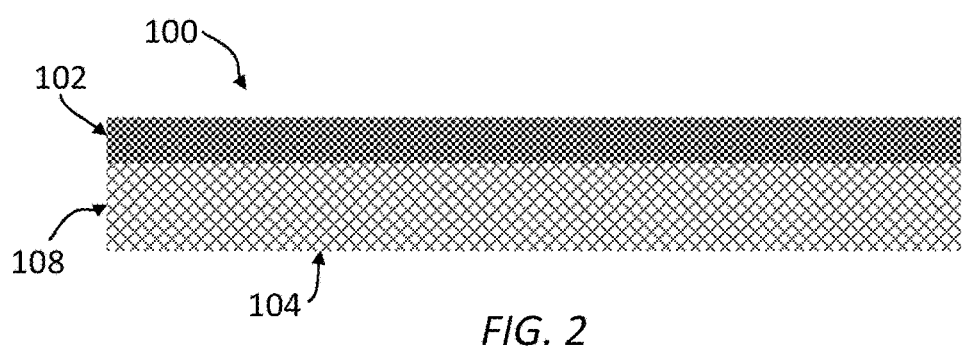
FIG. 2 is a cross-section view of a scaffold of a microporous layer and a porous layer including a monolithic aerogel structure disposed therein in accordance with embodiments disclosed herein

In some embodiments, microporous film 102 may be adjacent to a porous layer 108 as shown in FIG. 2. The monolithic aerogel structure 104 can extend across the interface (adjacent surfaces) of the microporous film 102 and porous layer 108. The microporous and porous layers create a scaffolding for the monolithic aerogel structure 104.

Figure 3:
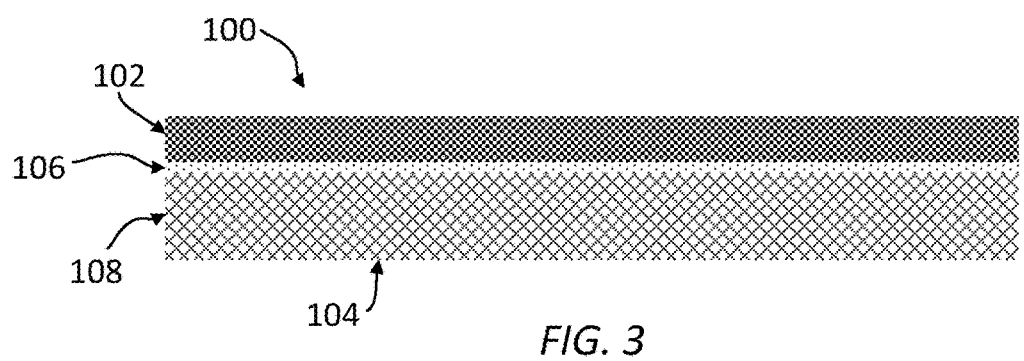
FIG. 3 is a cross-section view of a scaffold of a microporous layer adhered to a porous layer including a monolithic aerogel structure disposed therein in accordance with embodiments disclosed herein.

In some embodiments, microporous film 102 may be adjacent to a porous layer 108 as shown in FIG. 3 An adhesive layer 106 may be employed to connect the microporous film 102 and porous layer 108. In one embodiment, the adhesive layer 106 is a discontinuous layer comprising dots or lines. This allows the aerogel material to pass through the adhesive layer 106 when forming the insulating structure 100. Although an adhesive layer 106 is shown in FIG. 3, it should be understood that in other embodiments, such as that shown in FIG. 2, the adhesive layer 106 may be optional or may not be necessary. The monolithic aerogel structure 104 can extend across the interface (adjacent surfaces) of the microporous film 102 and porous layer 108. The microporous and porous layers create a scaffolding for the monolithic aerogel structure 104.

The microporous film 102 may trap dust freed from the porous layer 108 in addition to preventing dust from being freed from the microporous film 102. Typically the dust that may be freed is from the aerogel.

While the pore size of the microporous film 102 is small enough to retain aerogel dust within the scaffold, the microporous film 102 is also open enough to allow introduction of aerogel precursor into both the microporous film and the porous layer by flowing through the pores in the microporous film.

In one embodiment, the aerogel material is formed by flowing a sol gel into a surface of the microporous film 102, through the microporous film 102, and into the porous layer 108, and processing the sol gel to create an aerogel material. The aerogel material at least partially, or in some embodiments completely, fills the pores of the porous layer 108.

The thickness of each layer in the insulation construction 100 of FIGS. 2 and 3 may vary, but in certain embodiments, the porous layer 108 is thicker than the microporous film 102, and in some embodiments is at least twice as thick.

In some embodiments, microporous film 102 and/or porous layer 108 may be adhered or laminated to a structural layer (not shown) such as a textile layer. The textile layer may be a woven, knitted or non-woven material.

Figure 4:
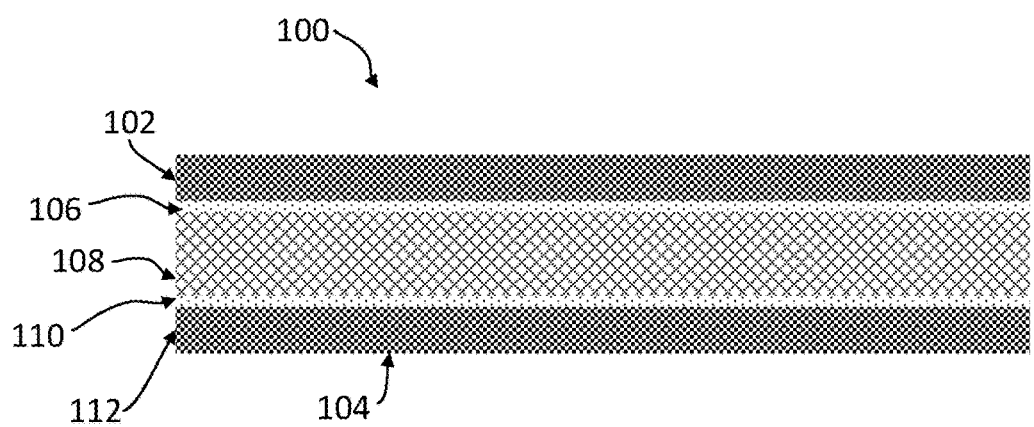
FIG. 4 is a cross-section view of a scaffold of microporous layers and a porous layer including a monolithic aerogel structure disposed therein in accordance with embodiments disclosed herein.

Depending on the intended use of the insulation structure 100 (e.g., into various garments, clothing, shoes, and textile articles) it may be advantageous to have microporous films on opposing surfaces of the porous layer to further trap and reduce freed dust. FIG. 4 shows an insulating structure 100 having microporous film 102 on one surface of porous layer 108 and a second microporous film 112 on an opposite surface of porous layer 108. Adhesive layers 106 and 110 may be used to adjoin the surfaces. As described above the adhesive layer may be discontinuous and in other embodiments, the adhesive layers may be optional. The monolithic aerogel structure 104 extends through both interfaces between the microporous film and porous layers.

Without being limiting the porosity of the microporous films 102, 112 may be similar or different, but both have a porosity that is less than the porosity of the porous layer 108.

In one embodiment, the monolithic aerogel structure 104 extends through microporous films 102 and porous layer 108 by at least partially filling the pores therein, but does not fill the pores of the second microporous film 112.

Figure 5:
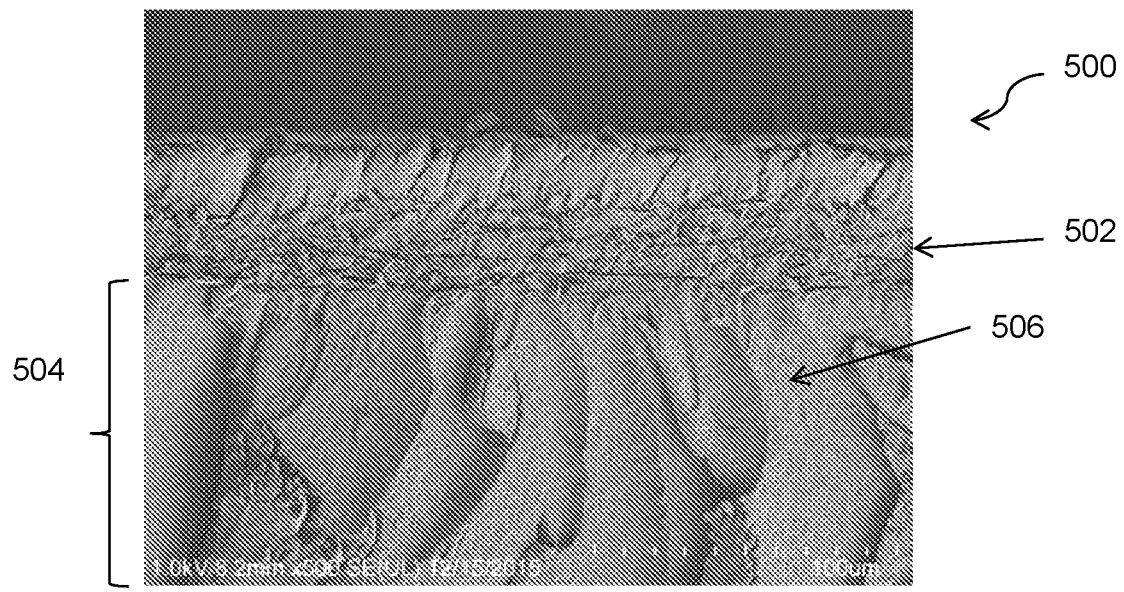
FIG. 5 is a scanning electron microscope (SEM) image of a scaffold of a microporous layer adjacent to a porous layer, wherein the scaffold includes an aerogel structure disposed therein in accordance with embodiments disclosed herein.

FIG. 5 is a scanning electron microscope (SEM) image of an insulating structure comprising a scaffold 500 including an ePTFE microporous film 502 adjacent to a foam porous layer 504, wherein the scaffold 500 includes an aerogel structure 506 disposed therein in accordance with embodiments disclosed herein. The aerogel structure 506 completely fills the pores of the foam porous layer 504 and as shown in FIG. 5, is visibly indistinguishable from the foam porous layer. FIG. 5 shows aerogel 506 completely filling the pores of the ePTFE microporous film 502 and transitioning across the ePTFE/foam interface.

Figure 6:
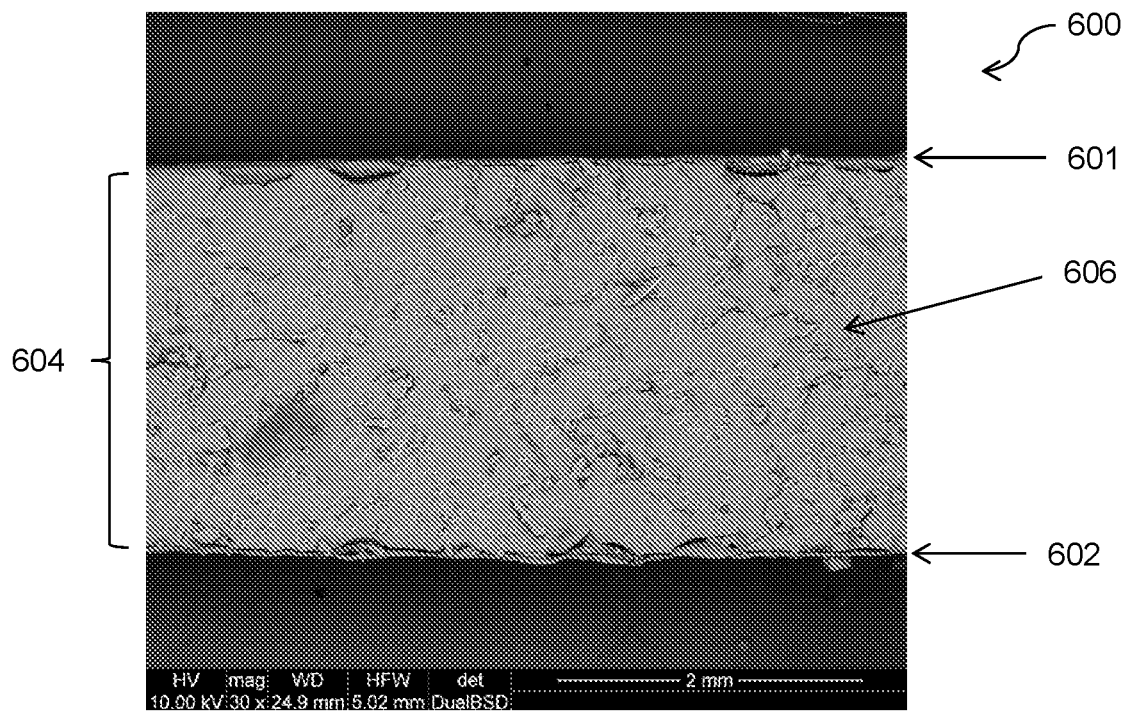
FIG. 6 is a scanning electron microscope (SEM) image of a scaffold of two microporous layers adjacent to a porous layer, wherein the scaffold includes an aerogel structure disposed therein in accordance with embodiments disclosed herein.

FIG. 6 is a scanning electron microscope (SEM) image of an insulating structure comprising a scaffold 600 of two microporous films 601, 602 on either side of a foam porous layer 604, wherein the scaffold 600 includes an aerogel structure 606 disposed therein in accordance with embodiments disclosed herein. The aerogel structure 606 completely fills the pores of the foam porous layer 604 and as shown in FIG. 6, is visibly indistinguishable from the foam porous layer. FIG. 6 shows aerogel 606 completely filing the pores of the microporous and porous layers and extending across the porous/microporous interface.

Figure 7:
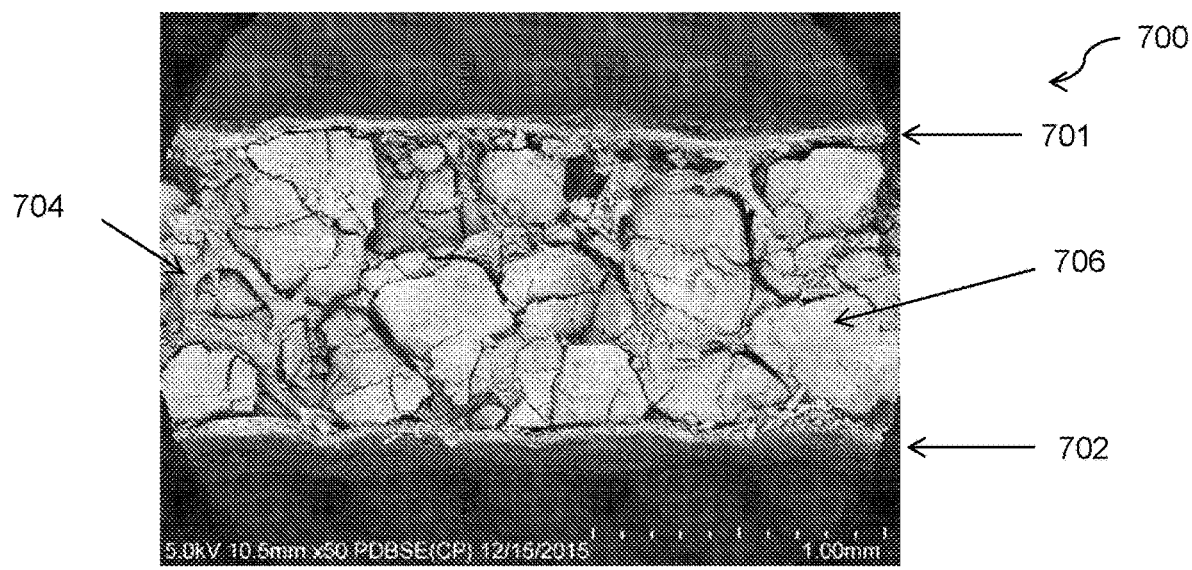
FIG. 7 is a scanning electron microscope (SEM) image of a scaffold of two microporous layers adjacent to a porous layer, wherein the scaffold includes an aerogel structure disposed therein in accordance with embodiments disclosed herein and wherein the aerogel has been somewhat damaged by use of the scaffold.

FIG. 7 is a scanning electron microscope (SEM) image of a scaffold 700 of two microporous films 701, 702 on either side of a porous layer 704, wherein the scaffold 700 includes an aerogel structure 706 disposed therein in accordance with embodiments disclosed herein. FIG. 7 shows the aerogel after some use during which the aerogel 706 has become cracked.

Although embodiments are shown with multiple layers, it should be understood that other embodiments may include additional layers of microporous and porous layers to form the scaffold.

Methods

Production of multi-layer insulating structures can include the following steps: a) attaching a fluid-permeable facing layer to a sheet of porous base material to produce a laminated reinforcement sheet, wherein the facing layer contains pores or holes with diameters large enough to allow fluids to diffuse through the facing material; b) infusing a gel precursor solution into the reinforcement sheet, wherein at least a portion of the gel precursor solution infuses through the facing layer into the base layer and wherein the gel precursor solution is combined with the laminated reinforcement sheet at a rate which allows the gel precursor solution to pass through the facing layer and infiltrate the reinforcement sheet; and c) transitioning the gel precursor material into a gel material comprising a gel framework. A portion of the gel precursor solution is retained within the pores or holes of the facing layer, such that the gel extends into at least a portion of the facing layer and also into at least a portion of the base layer. The resulting product is a multi-layer gel composition comprising: a) at least one base layer comprising a porous reinforcement material and a monolithic aerogel structure integrated within the porous reinforcement material; and b) at least one facing layer comprising a fluid-permeable microporous reinforcement material and a monolithic aerogel structure integrated within the fluid-permeable, microporous facing material; wherein at least a portion of the monolithic aerogel structure of the base layer extends into and is continuous with at least a portion of the monolithic aerogel structure of the facing layer.

Large-scale production of insulating structures can include a conveyor based system that combines gel precursors with a continuous reinforcement sheet, such as a polymeric reinforcement sheet, fiber reinforcement sheet, open-cell foam reinforcement sheet, or a combination thereof at one end of a conveyor to produce a continuous reinforced gel sheet. This reinforced gel sheet may be wound in a plurality of layers (preferably around a mandrel with a uniform tension) and processed in subsequent chemical treatment, aging and drying steps. Separator layers can be co-wound between the gel sheet layers to facilitate aging or drying of the gel material, such as providing a flow path for aging agents or drying materials. The separator layer can be impermeable (preferably impermeable to fluids at pressures below 1 psi, 5 psi or 10 psi) or permeable. Permeable layers may be in the form of perforated plastic sheets, mesh like material, perforated foil, or the like. In some embodiments, the facing layer provides a flow path for aging agents or drying materials, such that an additional separator layer is not required for aging and drying of the gel material.

Figure 8:
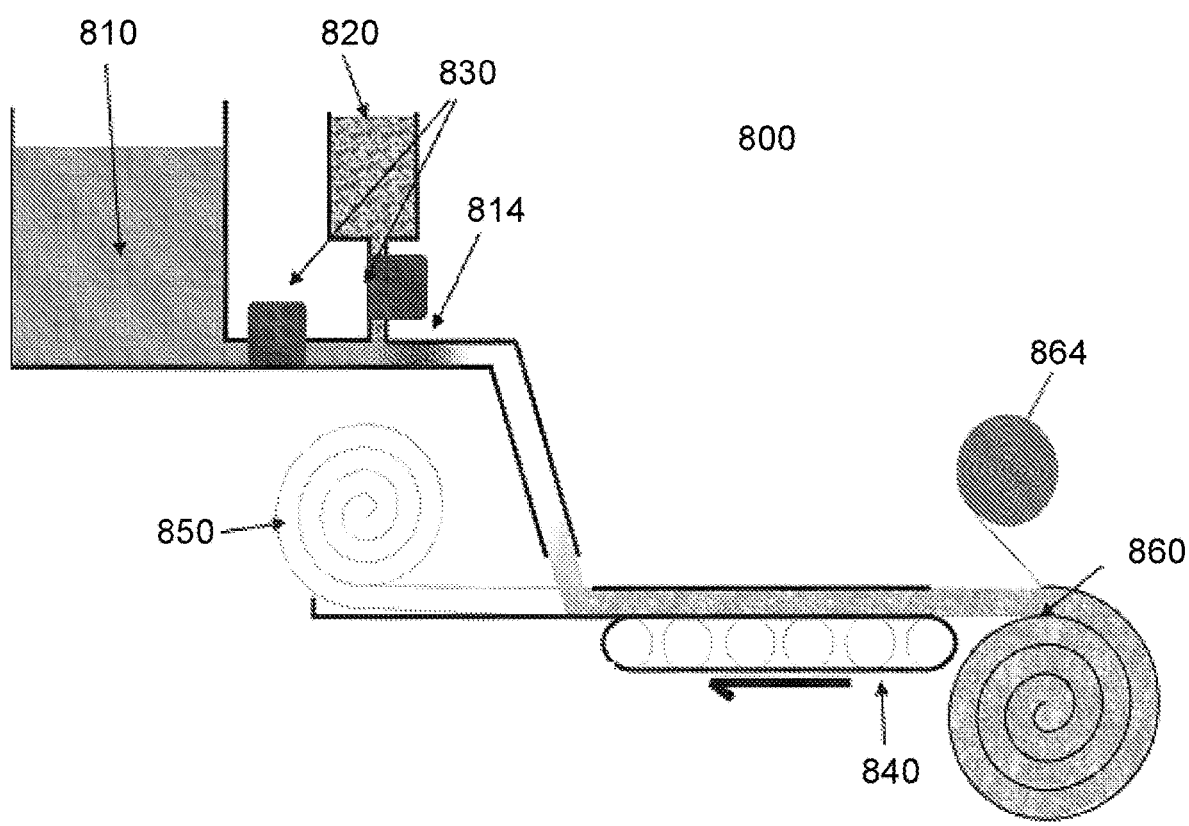
FIG. 8 depicts a method of preparing reinforced gel sheets from aerogel precursors and reinforcement sheets, using a conveyor system.

FIG. 8 illustrates one embodiment of a conveyor based system 800 for large-scale production of insulating structures. A gel precursor solution 810 is mixed with a catalyst solution 820 in a mixing section 814. The flow of the gel precursor solution 810 and catalyst solution 820 are controlled by flow controllers 830. A reinforcement material 850 is provided onto a conveyor system 840. The reinforcement material 850 can be a continuous sheet from a roll of reinforcement material. The reinforcement material 850 can also comprise segments of reinforcement material. In a preferred embodiment, the reinforcement material 850 is a polymeric reinforcement material, a fiber reinforcement material, an open-cell foam reinforcement material, or a combination thereof. The precursor solution (comprising gel precursor and catalyst) are dispensed onto conveyor belt 840 and combined with reinforcement material 850. The gel forming precursors in the gel precursor solution are transitioned into a gel material as the reinforcement material is advanced by the conveyor system 840. The resulting reinforced gel sheet is wound for subsequent chemical treatment, aging and drying steps. An additional separator layer 864 can be co-wound between the gel sheet layers 860.

Large-scale production of insulating structures can comprise a semi-continuous, batch-based process which is commonly referred as a gel-in-a-roll process, wherein the production comprises the following steps: a) attaching a facing layer comprising a first reinforcement material to a sheet of a second reinforcement material, wherein the facing layer contains pores or holes with diameters large enough to allow fluids to diffuse through; b) rolling the laminated reinforcement materials into a plurality of layers as a preform roll; and c) combining a gel precursor solution with the preform role. Separator layers may be co-rolled with the reinforcement material in the preform roll to provide a flow path for the gel precursor solution, aging agents, and drying materials. In a preferred embodiment, the facing layer provides a flow path for the gel precursor solution, aging agents, and drying materials, such that an additional separator layer is not required. In some embodiments, the first reinforcement material comprises a microporous polymeric material and the second reinforcement material comprises an open-cell foam reinforcement material.

Figure 9:
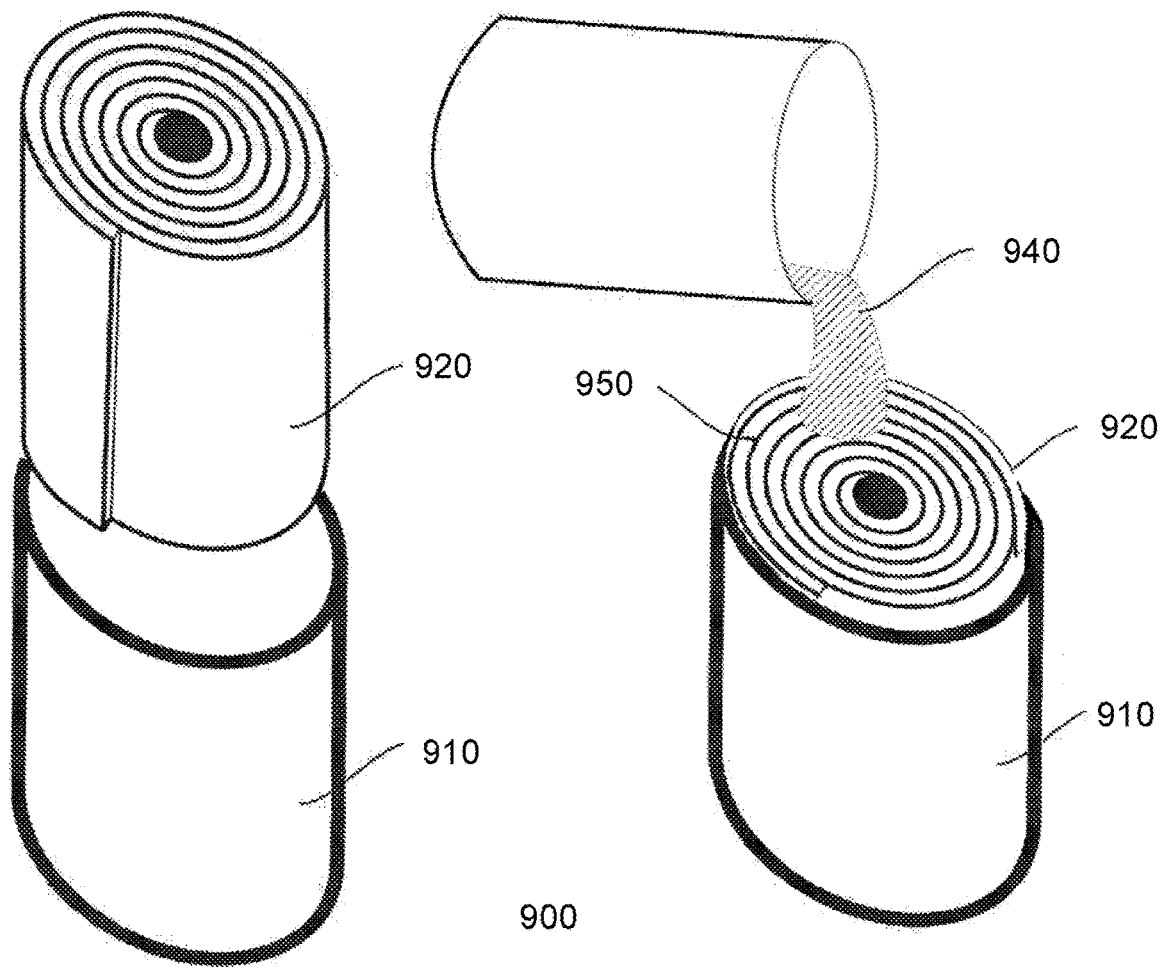
FIG. 9 depicts a method of preparing reinforced gel sheets from aerogel precursors and reinforcement sheets, using a gel-in-a-roll system.

FIG. 9 illustrates one embodiment of a semi-continuous, batch-based system 900 for large-scale production of insulating structures. Sheets of reinforcement material are rolled into plurality of layers as a preform roll 920 and placed into a container 910. Additional separator layers 950 may be co-rolled with the reinforcement material in the preform roll 920. The separator layers may be impermeable (preferably impermeable to fluids at pressures below 1 psi, 5 psi or 10 psi) or permeable. Permeable layers may be in the form of perforated plastic sheets, or mesh like material, perforated foil, or the like. A gel precursor solution 940 is infused or combined with the reinforcement material of the preform roll 920. The gel forming precursors in the gel precursor solution are transitioned into a gel material. The resulting reinforced gel sheet can be immediately advanced for subsequent chemical treatment, aging and drying steps. The resulting reinforced gel sheet can also be unwound, and then rewound with different separator layers prior to subsequent chemical treatment, aging and drying steps.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present invention to any specific type of aerogel and/or method of preparation. The present invention can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si-O-Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, $H_2SO_4$, $H_3PO_4$, oxalic acid and acetic acid. Any base may likewise be used to catalyze precursor reactions and to obtain a higher pH solution, with a preferable base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 100° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e. pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, strong capillary forces generated by liquid evaporation can cause shrinkage and pore collapse within the gel material. Maintaining the mobile phase near or above the critical pressure and temperature during the solvent extraction process reduces the negative effects of such capillary forces. In some embodiments of the present invention, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

Large-scale production of aerogel materials or compositions can be complicated by difficulties related to the continuous formation of gel materials on a large scale; as well as the difficulties related to liquid phase extraction from gel materials in large volumes using innovative processing and extraction techniques. Aerogel materials or compositions of the present disclosure are preferably accommodating to production on a large scale. In certain embodiments, gel materials of the present disclosure can be produced in large scale through a continuous casting and gelation process. In certain embodiments, aerogel materials or compositions of the present disclosure are produced in a large scale which requires the use of large scale extraction vessels. Large scale extraction vessels of the present disclosure can include extraction vessels which have a volume of about 0.1 m$^3$ or more, about 0.25 m$^3$ or more, about 0.5 m$^3$ or more, or about 0.75 m$^3$ or more.

Reinforced aerogel composites of the present invention may be shaped into a range of three dimensional forms, including paneling, pipe preforms, half-shell preforms, elbows, joints, and other shapes regularly required in the application of insulation materials to industrial and commercial applications. In one embodiment, the reinforcement material is formed into a desired shape prior to being infused with gel precursor material. The gel material is processed in a manner which allows the preform to maintain its shape, thus resulting in a reinforced aerogel preform of a desired shape. This technique of forming shaped aerogel preforms can be challenging and inefficient because of the difficulties required to process gel materials of various shapes and configurations.

In one embodiment, the reinforced gel composite is initially in a sheet form, and is processed into a desired three dimensional shape after gelation of the gel material, or after gelation of the gel material and subsequent drying. In a preferred embodiment, a sheet of reinforced aerogel material is heated to a desired temperature, formed into a desired shape, and then allowed to cool. This technique of shaping a reinforced aerogel material is particularly effective with foam reinforcement materials. In a preferred embodiment, a sheet of reinforced aerogel material comprising a foam reinforcement material is heated to a desired temperature, formed into a desired shape, and then allowed to cool. The desired temperature for heating the aerogel material should be a temperature above the softening point of the foam reinforcement material, and below the maximum use temperature of the reinforcement material and below the self-heating temperature of the aerogel material. The desired temperature should be high enough that the reinforcement material is soft and flexible enough to be formed into a desire shape, but still stable enough to support the aerogel material during the shaping process. The desired temperature for heating the aerogel material will thus vary depending on the type of reinforcement material and aerogel material being used. In one embodiment, the desired temperature is between 50° C. and 200° C., between 75° C. and 200° C., between 100° C. and 175° C., between 120° C. and 160° C., or about 150° C.

In one embodiment, the reinforced gel composite is initially in a block or molded form, and is processed into a desired three dimensional shape after gelation of the gel material, or after gelation of the gel material and subsequent drying. In one embodiment, a block of reinforced aerogel material is formed by combining the reinforcement material and the gel precursor in a mold of a certain shape. The material in the mold is allowed to gel, and then dried to produce a shaped aerogel composite. In a preferred embodiment, a block of reinforced aerogel material is produced, and then cut or lathed into a desired shape. In another preferred embodiment, a block of reinforced aerogel material is produced, and then cut into individual sheets using a skiving machine or apparatus.

Insulating structure can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [B4C], Diatomite, Manganese ferrite, MnO, NiO, SnO, $Ag_2O$, $Bi_2O_3$, carbon black, titanium oxide, iron titanium oxide, zirconium silicate, zirconium oxide, iron (I) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to: $TiOSO_4$ or $TiOCl_2$.

The embodiments of the present invention can be practiced using any of the processing, extraction and treatment techniques discussed herein, as well as other processing, extraction and treatment techniques known to those in the art for producing aerogels, aerogel-like materials, and insulating structures as defined herein.

The aerogel materials and compositions of the present invention have been shown to be highly effective as insulation materials. However, application of the methods and materials of the present invention are not intended to be limited to applications related to insulation. The methods and materials of the present invention can be applied to any system or application which would benefit from the unique combination of properties or procedures provided by the materials and methods of the present invention. The applications include, but are not limited to, insulation (including in apparel, shoes, buildings, piping, or industrial equipment), thermal barriers and panels (including fire barriers and panels), acoustical barriers, electronics, shock impact isolators, and chemical catalysis. Applications utilizing the composites of the invention may use single or multiple layers of the composites, and may mechanically alter composites of the invention such as through cutting them to size.

EXPERIMENTAL

The following examples provide various non-limiting embodiments and properties of the present invention. Although certain methods and equipment are described below, other methods or equipment determined suitable by one of ordinary skill in the art may be alternatively utilized.

Density

The density of membrane materials was calculated using the following equation: $\rho=m/w*l*t$, where: $\rho$=density (g/cc), m=mass (g), w=width (1.5 cm), l=length (16.5 cm), and t=thickness (cm)

Mass was measured with an analytical balance model, and thickness was measured with a Mitutoyo 547-400S thickness gauge). However, any suitable means for measuring mass or thickness can be used.

Gurley

The Gurley air flow test (Gurley Model 4340 Automatic Densometer) measures the time in seconds for 100 $cm^3$ of air to flow through a 6.45 $cm^2$ sample at 12.4 cm of water pressure.

Frazier Number

Air permeability was measured by clamping a test sample in a circular gasketed flanged fixture 5.5 inches (14 cm) in diameter, or 23.76 square inches (153.3 square cm) in area. The upstream side of the sample fixture was connected to a flow meter in line with a source of dry compressed air. The downstream side of the sample fixture was open to the atmosphere.

Testing was accomplished by applying an air pressure of 0.5 inches (1.27 cm) of water to the upstream side of the sample and recording the flow rate of air passing through the in-line flow meter (a ball-float rotameter).

Results for the average of 2 samples were reported in terms of Frazier Number which has units of cubic meters of air/minute/square meters of sample at 0.5 inches (1.27 cm) of water pressure.

Matrix Tensile Strength (for Membranes)

Samples were prepared by using a die punch to cut 165 mm long by 15 mm wide rectangular samples out of the ePTFE membrane. The membrane was placed on the cutting table such that it was free from wrinkles in the area where the sample was to be cut. The 165 mm×15 mm die was then placed on the membrane (generally in the center 200 mm of the web) such that its long axis was parallel to the direction that will be tested. Once the die was aligned, pressure was applied to it to cut through the membrane web. Upon removal of this pressure, the rectangular sample for testing was inspected to ensure it was free from edge defects which may impact the tensile testing. At least 3 samples in the machine direction and three samples in the transverse direction were prepared in this manner. Once samples were prepared, they were measured to determine their mass using an analytical balance and their thickness using a Mitutoyo 547-400S thickness gage. Note that any suitable means for measuring thickness can be used. Each sample was subsequently tested to determine its tensile properties using an Instron 5500 tensile tester. The samples were inserted into the tensile tester and held using Instron Catalog 2702-015 (rubber coated face plate) and 2702-016 (serrated face plate) grip plates such that each end of the sample was held between one rubber coated and one serrated face plate. The pressure applied to the grip plates was approximately 552 kPa. The gauge length between the grips was set at 50 mm and the crosshead speed (pulling speed) was set to a speed of 200 mm/min. A 500 N load cell was used to carry out these measurements and data was collected at a rate of 50 points/sec. The laboratory temperature was between 20 and 22.2 degrees Celsius to ensure comparable results. Finally, if the sample happened to break at the grip interface, the data was discarded. At least 3 samples in the machine direction and three samples in the transverse direction were successfully pulled (no slipping out of or breaking at the grips) in order to characterize the membrane web.

The following equation was used to calculate the matrix tensile strength:

$$MTS = F_{max} * (\rho_0 * l / 100 * m)$$

in which: MTS=Matrix tensile strength in MPa, $F_{max}$=maximum load measured during test (Newtons), $\rho_0$=density of PTFE (2.2 grams/cc), l=sample length (cm), and m=sample mass (grams).

Bubble Point

Bubble point pressures were measured according to the general teachings of ASTM F31 6-03 using a Capillary Flow Porometer (Model 3Gzh from Quantachrome Instruments, Boynton Beach, Fla.). The sample membrane was placed into the sample chamber and wet with Silwick Silicone Fluid (available from Porous Materials Inc.) having a surface tension of 20.1 dynes/cm. The bottom clamp of the sample chamber had a 2.54 cm diameter, 0.159 cm thick porous metal disc insert (Quantachrome part number 75461 stainless steel filter) was used to support the sample. Using the 3GWin software version 2.1 the following parameters were set as specified in the table immediately below. The values presented for bubble point pressure are the average of two measurements.

Bubble point pressure was converted to pore size using the following equation:

$$D_{BP} = 4\gamma^{lv} \cos\theta / P_{BP}$$

where $D_{BP}$ is the pore size, $\gamma^{lv}$ is the liquid surface tension, $\theta$ is the contact angle of the fluid on the material surface, and $P_{BP}$ is the bubble point pressure. It is understood by one skilled in the art that the fluid used in a bubble point measurement must wet the surface of the sample.

Bubble Point Instrument Settings

| Parameter | |
|---|---|
| Run Settings | |
| Starting pressure | 2.12 psig |
| Ending pressure | 85.74 psig |
| Sample Area | 3.14 cm² |
| Run Type | Wet Only |
| Number Data Points | 256 |
| Pressure Control | |
| Use Normal Equilibrium | TRUE |
| Use Tol | FALSE |
| Use Time | FALSE |

-continued

| | |
|---|---|
| Use Rate | FALSE |
| Use Low Flow Sensor | FALSE |
| Time Out | NA |
| Equil Time | NA |
| Run Rate | NA |
| Pressure Tolerance | NA |
| Flow Tolerance | NA |
| Smoothing | |
| UseMovAve | FALSE |
| MovAveWet Interval | NA |
| MovAveDry Interval | NA |
| Lowess Dry | 0.050 |
| Lowess Wet | 0.050 |
| Lowess Flow | 0.050 |
| Lowess Num | 0.100 |
| MinSizeThreshold | 0.98 |
| Bubble Point Parameters | |
| UseBpAuto | TRUE |
| UseBpThreshold (L/min) | FALSE |
| UseBpThreshold (Abs/cm2) | FALSE |
| UseBpThresholdNumber | FALSE |
| BpAutoTolerance (manual) | 1% |
| BpThresholdValue (manual) | NA |
| BpThreshold (abs/cm2) value | 0 |

Composite Density

Density determinations were gravimetrically determined using a standard analytical balance in conjunction with a volume determination in accordance with the general teachings described in ASTM C303.

Composite Thickness

Thickness of the composite was determined in accordance with the general teachings described in ASTM C303.

Thermal Conductivity

The thermal conductivity of the foam/aerogel composite was determined at a mean temperature of 37.8° C. at a compressive load of 2 PSI in accordance with the general teachings described in ASTM C518.

Example 1

For Example 1, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. A 0.61 m width roll of 90 pores/inch (ppi) (35.4 pores/cm) reticulated polyester polyurethane foam, with a nominal density of 2.2 lb/ft³ (35.2 kg/m³) and about 0.080 inch in thickness (2 mm) (RS090WHGR1, Crest Foam Industries Inc., division of INOAC, Moonachie, N.J.) was obtained.

A roll of expanded PTFE membrane (0.81 m) that had been subjected to temperatures above the crystalline melt temperature of PTFE and possessing the following properties was obtained: average thickness of 0.0137 mm, average density of 0.370 g/cc, average Frazier Number of 9.5, average Gurley Number of <1, average matrix tensile strength in the direction of the fibrils of 222 MPa, average matrix tensile strength in the direction orthogonal to the direction of the fibrils of 91 MPa, and pore size of 5.0 μm. This membrane was made generally in accordance with the teachings of U.S. Pat. No. 5,814,405.

A polyurethane adhesive similar to those cited in U.S. Pat. No. 4,532,316 was heated to a temperature sufficient to liquefy. The adhesive was applied to the membrane in a dot pattern with an adhesive laydown of about 40% by area via a gravure roll apparatus which had been heated to about 115° C.

The adhesive coated side of the membrane was adhered to one side of the reticulated polyurethane foam by passing it through a nip, and the resulting laminate was collected on a spool. Another length of the adhesive coated membrane was applied to the opposite side of the reticulated foam in a similar manner to create a laminated construct. The laminated construct was spooled and allowed to cure at room temperature for 48 hours.

A requisite amount of a sol comprising hydrolyzed tetraethoxysilane and its derivatives and condensation catalyst, aqueous ammonium hydroxide, were combined and allowed to infiltrate the laminated construct. After a syneresis period of 3-30 minutes the gel/foam composite was subjected to further chemical aging, in which the wet gel composite was exposed to a hot ethanol solution of ammonium hydroxide and a hydrophobic agent containing various amounts of alkyl and silyl groups (hexamethyldisilazane). After aging, the foam/aerogel composite was transferred to a cylindrical pressure vessel and was then dried using supercritical $CO_2$ extraction to remove the solvent. The composite was then treated with heat to remove any residual moisture content and/or volatiles.

Three samples measuring approximately 20 cm by 20 cm were cut from the laminate construct impregnated with aerogel. These samples were determined to have the following properties: average thickness of 1.61 mm; average density of 0.179 g/cc; average thermal conductivity 13.9 mW/mK. These samples demonstrated a high dust retention.

Example 2

For Example 2, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. Two different membranes of expanded polyethylene (ePE) were used as scaffolds. Both scaffolds were commercially available as Arioso™ composite membranes (Lydall) and were 8.5×11 inches. Both materials had an average Gurley number of less than 1 sec, and a pore size of 8.8 μm. These Arioso scaffolds contained ePE on one side of porous layer.

A requisite amount of a sol comprising hydrolyzed tetraethoxysilane and its derivatives and a condensation catalyst, aqueous ammonium hydroxide, were combined and allowed to infiltrate each membrane.

The membranes were determined to have the following properties before and after addition of the aerogel in Table 1. When testing thermal conductivity both samples were stacked and an average thermal conductivity was obtained as shown in Table 1. These materials demonstrated a high dust retention.

TABLE 1

| Sample | Thickness | | Density | | Average Thermal |
| | Initial | Final | Initial | Final | Conductivity at 37.5° C. |
| --- | --- | --- | --- | --- | --- |
| 1a | 0.70 | 0.85 | 0.142 | 0.194 | 13.6 mW/m-K |
| 1b | 0.47 | 0.50 | 0.132 | 0.171 | |

Example 3

For Example 3, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. A nonwoven fabric comprising oxidized polyacrylonitrile (OPAN) fiber with an areal density, 0.01-0.03 $g/cm^2$ was obtained.

A roll of expanded PTFE membrane (0.81 m) that had been subjected to temperatures above the crystalline melt temperature of PTFE and possessing the following properties was obtained: average thickness of 0.032 mm, average density of 0.587 g/cc, pore size of 0.47 μm, average Gurley number of 8.9 sec, average matrix tensile strength in the direction of the fibrils of 88 MPa, and average matrix tensile strength in the direction orthogonal to the direction of the fibrils of 35 MPa. This membrane was made generally in accordance with the teachings of U.S. Pat. No. 3,953,566.

A polyurethane adhesive similar to those cited in U.S. Pat. No. 4,532,316 was heated to a temperature sufficient to liquefy. The adhesive was applied to the membrane in a dot pattern with an adhesive laydown of about 40% by area via a gravure roll apparatus which had been heated to about 115° C.

The adhesive coated side of the membrane was adhered to one side of the reticulated polyurethane foam by passing it through a nip, and the resulting laminate was collected on a spool. Another length of the adhesive coated membrane was applied to the opposite side of the reticulated foam in a similar manner to create a laminated construct. The laminated construct was spooled and allowed to cure at room temperature for 48 hours.

A requisite amount of a sol comprising hydrolyzed tetraethoxysilane and its derivatives and a condensation catalyst, aqueous ammonium hydroxide, were combined and allowed to infiltrate the laminated construct. After a syneresis period of 3-30 minutes the gel/foam composite was subjected to further chemical aging, in which the wet gel composite was exposed to a hot ethanol solution of ammonium hydroxide and a hydrophobic agent containing various amounts of alkyl and silyl groups (hexamethyldisilazane). After aging, the foam/aerogel composite was transferred to a cylindrical pressure vessel and was then dried using supercritical $CO^2$ extraction to remove the solvent. The composite was then treated with heat to remove any residual moisture content and/or volatiles.

Ten samples measuring approximately 10 cm by 10 cm were cut from the laminate construct impregnated with aerogel. These samples were determined to have the following properties: average thickness of 2.29 mm; average density of 0.0243 g/cc; average thermal conductivity 17.4 mW/mK. These samples demonstrated a high dust retention.

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the invention and does not pose a limitation on the scope of the invention unless otherwise claimed.

Insulating structures have been described above both generically and with regard to specific embodiments. It will be apparent to those skilled in the art that various modifications and variations can be made in the embodiments without departing from the scope of the disclosure. Thus, it is intended that the embodiments cover modifications and variations provided they come within the scope of the appended claims and their equivalents.

What is claimed is:

1. An insulating structure comprising:
   a scaffold comprising:
      at least one microporous film,
      wherein the at least one microporous film is not a fibrous layer including microporous fibers, and
      wherein the at least one microporous film comprises an expanded fluoropolymer film, expanded polytetrafluoroethylene (ePTFE) film, expanded polyethylene (ePE) film, or expanded polypropylene (ePP) film,
   at least one porous layer adjacent to the at least one microporous film, and
   an aerogel structure,
   wherein a portion of the aerogel structure extends through at least a portion of the at least one microporous film and also extends through at least a portion of the adjacent porous layer, and
   wherein the at least one microporous film has a smaller average pore size than the porous layer.

2. The insulating structure of claim 1, wherein the porous layer comprises a foam layer or a textile layer.

3. An insulating structure comprising:
   a scaffold comprising:
      at least two microporous films,
      wherein the at least two microporous films are not fibrous layers including microporous fibers,
      at least one porous layer, and
      an aerogel structure,
         wherein the at least two microporous films are adjacent to the at least one porous layer on opposite sides of the porous layer,
         wherein a portion of the aerogel structure extends through at least a portion of the at least two microporous films and also extends through at least a portion of the at least one porous layer,
         wherein the at least two microporous films comprise expanded polytetrafluoroethylene (ePTFE) and wherein the at least two microporous films each have a smaller average pore size than the porous layer.

4. The insulating structure of claim 3, wherein the ePTFE film comprises a pore size from 0.03 µm to 210 µm.

5. An insulating structure comprising:
   a scaffold comprising:
      at least one microporous film,
   wherein the at least one microporous film is not a fibrous layer including microporous fibers,
   at least one porous layer adjacent to the at least one microporous film,
      wherein the porous layer comprises a foam layer or a textile layer, and
      an aerogel structure,
   wherein a portion of the aerogel structure extends through at least a portion of the at least one microporous film and also extends through at least a portion of the adjacent porous layer, and
   wherein the at least one microporous film has a smaller average pore size than the porous layer.

* * * * *